Patented Jan. 5, 1926.

1,568,271

UNITED STATES PATENT OFFICE.

DAVID H. CROSSER, OF CHICAGO, ILLINOIS, ASSIGNOR TO CHICAGO CRUCIBLE COMPANY, OF CHICAGO, ILLINOIS, A CORPORATION OF ILLINOIS.

PROCESS FOR TREATING METALS AND COMPOSITION THEREFOR.

No Drawing.  Application filed August 29, 1924. Serial No. 735,040.

*To all whom it may concern:*

Be it known that I, DAVID H. CROSSER, a citizen of the United States, residing at Chicago, in the county of Cook and State of Illinois, have invented certain new and useful Improvements in Processes for Treating Metals and Composition Therefor, of which the following is a specification.

My invention relates to a process for treating metals and composition therefor, and refers particularly, although not exclusively, to the treatment of cast iron by which the same may be purified or alloyed with other metals in order to give a desired composition and physical characteristics.

In melting pig iron and scrap in a cupola, it is possible to predict the composition of the metal delivered from the cupola, provided the analyses of the pig iron and iron scrap charged into the cupola are accurately known. It frequently happens, however, that pig iron and scrap are not available in order to produce metal of the desired analysis and physical characteristics, and in such case it has been customary to add elements in the ladle in order to give the iron the desired composition. For example: If the iron produced from the pig iron and scrap which is available is of too low a silicon content, or too low a manganese content, it has been customary to add ferro-silicon or ferro-manganese, as the case may be, in the ladle in sufficient quantities to raise the silicon or manganese content to the desired point.

It has been found that this method of treatment has proved unsatisfactory from a number of points of view. The ferro-silicon, the ferro-manganese, or other alloying element, if added in a lump form, does not become evenly distributed through the metal and leads to segregation; that is, when a casting is poured it will be found that there is a much higher percentage of manganese or silicon in one part of the casting than in another, thus causing inequalities in the physical properties of the casting, so that if the latter, for instance, is subjected to wear, it will be found that it wears much more rapidly in one part of the casting than in another.

Furthermore, if the alloying elements are added in a finely divided or pulverized state, they will not properly mix with the metal, but will largely go off into the slag so that they become wasted.

It has also been proposed to charge ferro-silicon, ferro-manganese, or the like, in the cupola with each charge of iron. If the alloying elements are used in lump form, the same objections are present as in the case of additions made in the ladle, namely, lack of uniform distribution; while at the same time the alloying elements are subjected to the oxidizing action of the blast with consequent waste, and the result that the oxides of the metals go off in the slag instead of having the alloying metals themselves unite with the iron in order to perform their proper function.

If the alloying ingredients are used in pulverized form, the oxidizing action of the blast is still more pronounced, in addition to which a large amount of the pulverized alloying elements are blown away by the action of the blast itself.

It is the object of my invention to overcome the various difficulties which have been mentioned above and to treat the iron with alloying or purifying elements, to which for the sake of simplicity, I have given the name of "modifying elements", in such manner that the iron will be uniformly subjected to the action of the modifying elements, so that no segregation will take place, while at the same time loss by oxidation and blowing away by the blast is effectively prevented.

It is a further object of my invention to control the composition of the finished iron within very close limits, this result being obtained by the prevention of the oxidation of the modifying elements.

In order to carry out my invention, I make use of briquettes containing the modifying elements in a relatively finely pulverized state, mixing them with a binder of ceramic material, such as clay, or the like, which preferably has a melting point substantially the same as the melting point of the iron to be treated, and an amount of ceramic binder is used in each briquette which is largely in excess of that required merely for binding together the various ingredients, so that the excess of ceramic binder may be utilized on account of its vehicular character in distributing and disseminating the modifying elements throughout a relatively large volume in each briquette.

As above stated, what I have termed the modifying elements may be either in the nature of purifying or alloying elements. For example: If it is desired to subject the iron to a purifying action, aluminum may be used, and as is well known this unites with the oxygen of the iron forming aluminum oxide, which thus purifies the iron by de-oxidizing, but the aluminum does not enter into the finished composition of the iron itself.

On the other hand, chromium, nickel, manganese, silicon, vanadium, titanium and other elements, which directly enter into an alloying action with the iron, may be used for the purpose of giving the desired chemical composition and physical properties to the finished iron. Such alloying elements may be used either in pure metallic form or in the form of the well known ferro alloys. For example: Nickel is ordinarily used as pure metallic nickel in the form of fine shot. Chromium, manganese, silicon, vanadium, titanium, and other elements, on the other hand are ordinarily employed in the form of ferro-chromium, ferro-manganese, ferro-silicon, ferro-vanadium, ferro-titanium, etc., it being understood that it is within the scope of my invention to use the alloying or purifying elements, or, as I have termed them, the modifying elements, either in the form of relatively pure metals or in the form of ferro or other alloys.

The following is a specific example of the composition of briquettes which I have advantageously employed, and which embody my invention:

| | Per cent by weight. |
|---|---|
| Clay | 69.47 |
| Nickel | 10.41 |
| Ferro-manganese (80% manganese) | 5.55 |
| Ferro-silicon (50% silicon) | 8.33 |
| Ferro-chromium (65% chromium) | 3.47 |
| Aluminum | 2.77 |
| | 100.00 |

I have found that a clay which may advantageously be used is the so-called Montezuma clay, consisting of hydrated silicate of aluminum with a certain amount of free silica.

In making up briquettes of the above and other compositions, the various ingredients are relatively finely divided or pulverized, mixed with water, and then molded by any of the well known methods, as, for example, by extruding through a die under pressure, and then cutting to suitable length to form the individual briquettes, after which the latter are dried.

It will be observed that in the above mentioned specific illustration, the amount of clay which is used is greatly in excess of that required to bind together the other ingredients. As pointed out above, I use this excess in order to obtain a distribution of the modifying elements throughout a relatively large volume, utilizing the vehicular character of the clay for this purpose.

The relatively large amount of clay, or other similar ceramic binder which is used, is still further illustrated by considering the specific composition above mentioned on the basis of percentages by volume, instead of percentages by weight, of the various ingredients.

The specific volumes of the ingredients of the above mentioned composition are as follows:

| | |
|---|---|
| Clay | .383 |
| Nickel | .114 |
| Ferro-manganese | .150 |
| Ferro-silicon | .214 |
| Ferro-chromium | .142 |
| Aluminum | .37 |

Based upon the specific volumes given, by simple calculation, entirely familiar to those skilled in the art, the percentages by volume of the various ingredients of the above mentioned composition are as follows:

| | Per cent. |
|---|---|
| Clay | 83.4 |
| Nickel | 3.7 |
| Ferro-manganese | 2.6 |
| Ferro-silicon | 5.6 |
| Ferro-chromium | 1.5 |
| Aluminum | 3.2 |
| | 100.0 |

I have found as a matter of practical experience that in order to adequately utilize the vehicular character of the ceramic or other binder, in order to obtain adequate distribution of the modifying elements by means of relatively large volume of the briquette, that the ceramic or other binder elements should equal at least fifty per cent by volume of the briquette, and much higher percentages by volume than this can be employed very advantageously, it being seen, for example, that in the specific example of composition which I have given the per cent by volume of the binder is 83.4 per cent.

In this way not only are the modifying ingredients of the briquette distributed through a large volume, thereby effecting an excellent distribution of the modifying element, or elements, throughout the metal to be treated, but each briquette, while containing comparatively small quantities of the modifying elements, has sufficient volume so that as the change of iron descends in the cupola, the briquettes do not drop through the interstices between different pieces of iron, but maintain their relative position in relation to the charge. It will be understood that in order to make up the required volume of the briquette, the binding material proper may be mixed with other carrying substances which have no purifying or alloying action with respect to the iron bath, and the term "binder" as I use it is sufficiently broad to cover all such material.

As a practical matter, I have found that briquettes weighing substantially one pound are excellently adapted for use in the cupola. One briquette is used for each one hundred pounds of pig iron or scrap which is charged, and the amount of the modifying elements used in each briquette is calculated to give the desired result or chemical composition of the iron as it leaves the cupola.

In a small 37-inch cupola, there is ordinarily used about 1000 pounds of iron in each charge, so that in this case ten briquettes would be used for each charge or layer of iron, usually consisting of pig iron and scrap. In a large 64-inch cupola, on the other hand, there is approximately 2,000 pounds of iron in each charge, so that in this case twenty briquettes would be used evenly distributed throughout the charge of metal.

By this system of using comparatively small amounts of the modifying elements in each briquette, and using a larger number of briquettes, while at the same time each briquette is of comparatively great volume, so that the distribution of briquettes throughout the charge is maintained, I have found that excellent results are obtained.

I am aware that iron turnings, flue dust, and the like, have heretofore been agglomerated into briquettes by the use of a clay or other binder, and these briquettes have been charged in a blast furnace or cupola; and also that alloying or purifying elements in pulverized condition have been mixed with clay in order to form briquettes and then added to molten metal, but it has always been customary heretofore to use the clay or other similar binder in a comparatively small percentage merely for the purpose of holding together the iron turnings, flue dust, or the like; whereas in my improved process, and the briquettes which are used therefor, the ceramic or other binder is used in a much larger proportion, with the resulting advantages, as above pointed out, which could not be obtained in the briquettes as heretofore employed.

In carrying out my improved process, the briquettes containing the modifying elements are charged into the cupola with each charge of iron and evenly distributed throughout the same. As the cupola is operated in the well known manner, the charge of iron gradually descends in the cupola and comes into the melting zone in which the iron is melted under the influence of the blast and coke.

As the iron begins to melt, the briquettes having a ceramic binder preferably of substantially the same melting point as the iron, also begin to melt, thereby gradually carrying the modifying elements into contact with the molten iron which accumulates in the hearth of the cupola. On account of the wide distribution of the modifying elements obtained in the manner heretofore set forth, the iron is very uniformly subjected to either the purifying or alloying action of the modifying elements, as the case may be, and a very even and uniform product is obtained.

The pulverized or finely divided modifying elements are effectively prevented from oxidation by means of the ceramic or other binder which passes into the slag as the molten iron accumulates in the hearth, this slag being drawn off through the slag hole in the well known and usual manner.

I have described my invention as particularly useful in connection with the treatment of iron in a cupola, but it will be understood that in its broader aspects my invention is applicable to a wide variety of uses. For example: It may be used in a blast furnace for the production of pig iron from ore; it may be used in the production of steel in an open hearth furnace, either by adding the briquettes to the charge before tapping, or by adding the briquettes in the ladle; and it may be used in connection with the treatment of other metals, such as copper, aluminum, and the like, where it is desired to subject these metals to a purifying or alloying action.

It will be apparent to those skilled in the art that many changes could be made in the specific details of the invention as I have described it without departing from the spirit or scope thereof, as set forth in the accompanying claims.

What I claim is:

1. The process for treating metal, which consists in melting with said metal a briquette containing a modifying element in relatively fine condition disseminated and held in a binder of relatively great volume compared to the volume of said modifying element.

2. The process of treating metal, which consists in melting with said metal a briquette containing a modifying element in relatively fine condition disseminated and held in a ceramic binder having substantially the same melting point as that of said metal, said binder being of relatively great volume compared to the volume of said modifying element.

3. The process for treating iron, which consists in melting with said iron a briquette containing a modifying element in relatively fine condition disseminated throughout a ceramic binder of relatively great volume compared to the volume of said modifying element.

4. The process for treating iron, which consists in charging a blast operated furnace with successive layers of fuel and iron, and adding to each charge of iron a plurality of briquettes containing a modifying element in relatively fine condition disseminated in a binder of relatively great volume in relation to said modifying element.

5. A process for treating iron, which consists in charging a blast operated furnace with successive layers of fuel and iron, and adding to each charge of iron a plurality of briquettes of a size sufficient to maintain their relative position in respect to the charge as the burden descends in the furnace, said briquettes containing a modifying element in relatively fine condition disseminated in a binder of ceramic material.

6. A process for treating iron, which consists in charging a blast operated furnace with successive layers of fuel and iron, and adding to each charge of iron one briquette for approximately each 100 pounds of said charge of iron, said briquette containing a modifying element in relatively fine condition disseminated in a binder of ceramic material of relatively great volume in relation to said modifying element.

7. A composition for treating metal, comprising a briquette containing a relatively finely divided modifying element, and a ceramic binder of relatively great volume compared to the volume of said modifying element, said modifying element being disseminated throughout said binder.

8. A composition for treating metal, comprising a briquette containing a finely divided modifying element, and a ceramic binder having a volume in excess of fifty per cent of the volume of said briquette, said modifying element being disseminated throughout said binder.

9. A composition for treating metal, comprising a briquette containing a finely divided modifying element disseminated and held in a clay binder of substantially the melting point of the metal to be treated, said binder having a volume in excess of fifty per cent of the volume of the briquette.

10. A composition for treating metal, consisting of a briquette containing relatively finely divided ferro-chromium disseminated and held in a ceramic binder of a volume in excess of fifty per cent of the volume of said briquette.

Signed at Chicago, Illinois, this 26th day of August, 1924.

DAVID H. CROSSER.